United States Patent
Hart et al.

[11] Patent Number: 5,548,875
[45] Date of Patent: Aug. 27, 1996

[54] SAFETY SNAP

[76] Inventors: Courtney L. Hart, 23400 Old Santa Cruz Hwy., Los Gatos, Calif. 95030; Brian F. Tischer, 3600 Stage Rd., Pescadero, Calif. 94060; David G. Lloyd, 135 Molina Dr., Santa Cruz, Calif. 95060

[21] Appl. No.: 375,491

[22] Filed: Jan. 18, 1995

[51] Int. Cl.⁶ .................................................. A44B 13/00
[52] U.S. Cl. ......................... 24/265 H; 24/598.4; 24/905
[58] Field of Search .................................. 24/265 H, 3.4, 24/3.3, 597, 115 F, 684, 598.4, 905, 311, 602; 119/14.1

[56] References Cited

U.S. PATENT DOCUMENTS

| | | | |
|---|---|---|---|
| 1,299,821 | 4/1919 | Carpmill et al. | 24/905 |
| 2,356,715 | 8/1944 | Webster | 24/598.4 |
| 2,612,139 | 9/1952 | Collins | 24/684 |
| 3,540,089 | 11/1970 | Franklin | 24/602 |
| 3,774,870 | 11/1973 | Sheffield et al. | 24/311 |
| 3,994,265 | 11/1976 | Banks | 24/597 |
| 4,186,690 | 2/1980 | Seiler | 24/115 F |
| 4,742,605 | 5/1988 | Ritacco | 24/602 |
| 5,027,477 | 7/1991 | Seron | 24/3.4 |

OTHER PUBLICATIONS

"Curing Crosstie Hangups", Michael Plumb's Horse Journal, Sep. 1994, two sheets.
"A Crosstie Suggestion", Michael Plumb's Horse Journal, Nov. 1994, two sheets.

*Primary Examiner*—Victor N. Sakran
*Attorney, Agent, or Firm*—Michael A. Glenn

[57] ABSTRACT

A safety snap for restraining livestock that is releasable upon the application of a selected force by the animal to minimize the possibility and severity of injury to the animal and handler. A lead rope is attached to the safety snap, which is clasped to the halter. Application of a selected amount of force by the animal breaks a shear pin, unlatching the safety snap to release the lead rope. The safety snap remains attached to the halter. A reservoir in the safety snap contains replacement shear pins.

11 Claims, 1 Drawing Sheet

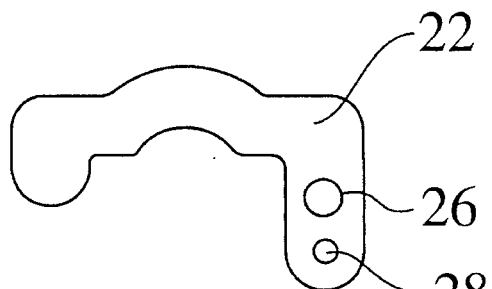
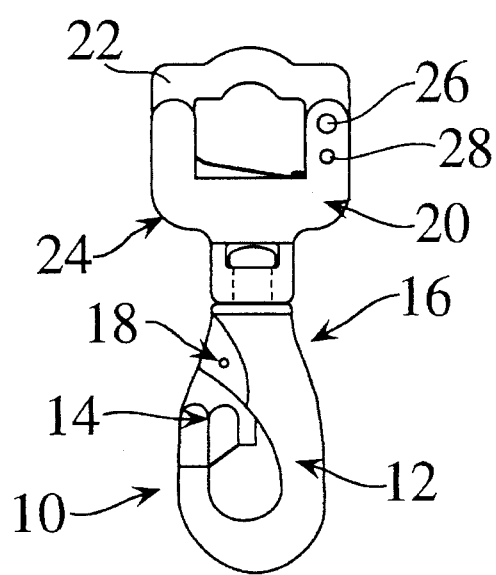
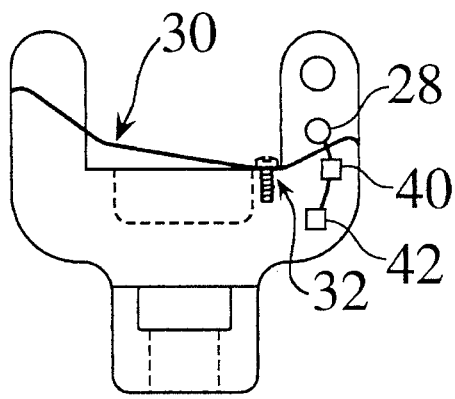
Figure 1
Figure 2
Figure 3
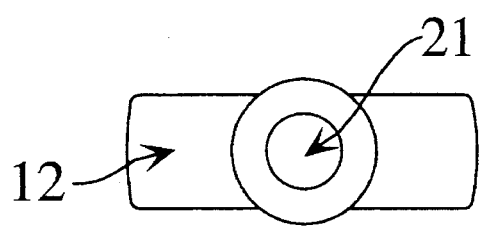
Fig. 1a
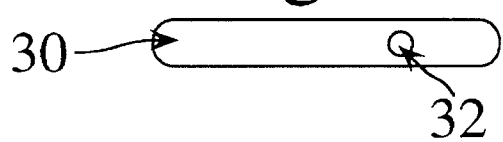
Fig. 3b
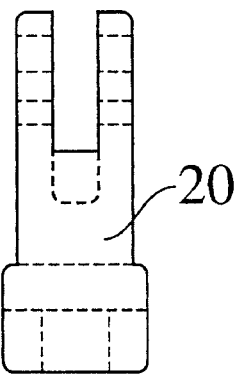
Fig. 3c
Fig. 3a
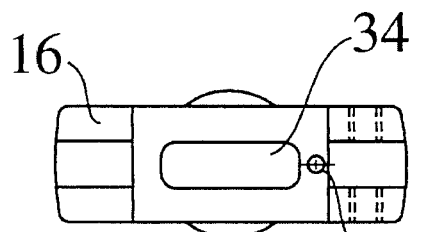
Figure 4

SAFETY SNAP

BACKGROUND OF THE INVENTION

1. Technical Field

The invention relates generally to fastening devices. More particularly, the invention relates to a safety snap for securing livestock, and that includes a replaceable shear pin.

2. Description of the Prior Art

It is a well known technique of livestock care to use lead ropes to restrain the animals. These lead ropes are typically secured to the animals with devices known as snaps. For horses, lead ropes or reins are tied to the snap, which is then attached to the halter.

Horses may become frightened or upset, and may attempt to free themselves from the lead ropes. High quality prior art snaps, designed for securing horses, tend to break at near or greater than the weight of the horse. As a result, the horse is often putting its full weight into breaking loose from the restraints. If the horse pulls with sufficient force, the snap breaks. The application of this amount of force can cause the snap to fly through the air. A flying snap has been known to cause severe injury to the animal, to the rider, or to bystanders, including loss of eyes.

On the other hand, if the snap does not break in certain circumstances, the horse may panic and seriously injure itself or its handler. In extreme cases, this can result in death.

Prior art snaps which are designed to break at a lower strength are also subject to various other deficiencies. Their tendency to break increases the cost of fixing or replacing the snap. A broken snap remains attached to the end of the crossties, and can cause injury. If the snap breaks when the rider is in a location at which there are no replacements, the animal must be tied or ridden with the damaged equipment.

Some of the difficulties in using the prior art snaps are detailed in M. Plumb, *Curing Cross-Tie Hangups,* Michael Plumb's Horse Journal (Sep. 1994), which describes the dangers of using crossties to restrain horses. The article teaches that the most effective and safe crossties use tie materials and snaps that release easily with tension. The theory espoused is that it is safest to the horse and bystanders if the snap and crosstie break easily and quickly. Plumb teaches that the prior art snaps with higher breaking tensions are more dangerous to use when restraining a horse. However, in the event the crossties break, the loose horse would have heavy chains dangling from its halter. If the horse continued to panic, it could inflict damage upon itself and other. This approach can also be quite costly, and inconvenient, for the reasons previously stated.

More recently, a letter published in Michael Plumb's Horse Journal (Nov. 1994) suggests that loops of baling twine or yarn be tied to both sides of the halter, and not to the ends of the ties. The crosstie snap is then attached to the loops. If the horse pulls back, the twine breaks, and the crossties fall to the side. This would avoid the problem of heavy chains dangling from the halter in the event the crossties break. However, none of the other foregoing problems of safely securing crossties to the halter and snap are addressed by the author of this letter.

It would be a significant advance in the art to provide a safety snap which can withstand a higher level of force without increasing the risk of injury to the horse or rider. It would be particularly useful to provide such a safety snap that can be quickly, easily, and inexpensively repaired, that can be adapted to break at different levels of force, and that minimizes the risk of injury to horse and human bystanders.

SUMMARY OF THE INVENTION

The invention provides a safety snap for restraining livestock. The safety snap releases upon the application of a selected force to the snap by the animal, thus minimizing the possibility and severity of injury to the animal, as well as to the handler.

In the preferred embodiment of the invention, a first clasp member having a pin storage reservoir that contains replacement shear pins is movably attached to a second clasp member. The second clasp member is upwardly biased against the first clasp member to form a closed clasp. Application of pressure to the second clasp member opens the clasp. A first latch member rotatably attached to the first clasp member is, in turn, attached to a second latch member by a pin, such that the second latch member is fixed for rotation about the pin's axis.

A shear pin secures the first latch member in fixed attachment to the second latch member to close the latch. A lead rope is tied to the latch of the safety snap, which is then attached to the halter of the horse. The shear pin is upwardly biased by a resilient metallic leaf spring that is affixed to the first clasp member and that covers the storage reservoir. The shear pin is adapted to break when the horse applies a selected amount of force to the safety snap. When the shear pin breaks, the horse pulling on the lead rope opens the latch and releases the lead rope. The safety snap remains on the halter, with the reservoir easily uncovered for access to replacement shear pins.

BRIEF DESCRIPTION OF THE DRAWINGS

FIG. 1 is a schematic front view of the invention;

FIG. 1a is an enlarged top view of the first clasp member of the invention;

FIG. 2 is an enlarged schematic front view of the second latch member of the invention;

FIG. 3 is an enlarged schematic front sectional view of the first latch member of the invention;

FIG. 3a is an enlarged front view of the resilient member;

FIG. 3b is an enlarged top view of the resilient member;

FIG. 3c is an enlarged side view of the first latch member; and

FIG. 4 is an enlarged schematic top view of the second latch member of the invention.

DETAILED DESCRIPTION OF THE INVENTION

The invention provides a safety snap for restraining livestock, that releases upon the application to the snap of a selected force by the animal, thus minimizing the possibility and severity of injury to the animal, as well as to the handler.

FIG. 1 is a schematic front view of the inventive safety snap 10. A first clasp member 12 and second clasp member 14 are movably attached to each other, such that the second clasp member is biased against the first clasp member to form a closed clasp 16. In the preferred embodiment of the invention, the first and second clasp members are attached by, and rotate about the axis of, a pin 18. However, alternate means of attachment, such as a rivet or screw may also be used. A first latch member 20 is rotatably attached to the first clasp member. The first latch member may rotate about a pivot pin or any other suitable member.

Application of pressure to the second clasp member rotates the second clasp about the pin to open the clasp. While the clasp of the preferred embodiment of the invention is dimensioned for attachment to the halter of a horse, it is readily appreciated that the clasp may be configured for other uses, such as to secure rigging on a boat.

FIG. 1a is an enlarged top view of the first clasp member showing the pivot pin 21. The second latch member 22 is pivotally attached to the first latch member to form a latch 24. Again, a pin 26 attaches the first and second latch members in the preferred embodiment, although a rivet, screw, or other means of attachment may also be used. The latch of the preferred embodiment is dimensioned to hold a lead rope, which is then attached to the halter of the horse. However, the latch is readily adaptable to secure differently sized ropes or other objects, including, but not limited to rings, hooks, or other clasps. A shear pin 28 secures the first latch member in fixed attachment to the second latch member to close the latch.

FIG. 2 is an enlarged front view of the second latch member 22, showing the pin 26 and the shear pin 28. While in the preferred embodiment of the invention, the pin is located directly above the shear pin, it will be appreciated that one skilled in the art can position the pin and shear pin in other locations. Alternate embodiments of the invention may use more than one pin and/or shear pin.

FIG. 3 is an enlarged front view of the first latch member of the invention. The shear pin 28 is upwardly biased by a resilient member 30, which is affixed to the first latch member 24 by a removable screw 32 or, alternately, by other means for attachment such as a rivet. An enlarged front view of the resilient member is shown in FIG. 3a, while an enlarged top view with the removable screw 32 is shown in FIG. 3b.

The shear pin is adapted to break when the horse applies a selected amount of force to the safety snap. When the shear pin breaks, the resilient member urges the second latch member away, releasing the second latch member from the first latch member, such that the first latch member may pivot on the pin, thus opening the latch and releasing the lead rope. The safety snap remains clasped to the halter, and thus does not fly through the air when the lead rope is forcibly broken. This minimizes the possibility of injury to the animal or handler, as well as the chance of losing a flying snap. In the preferred embodiment of the invention, the resilient member is a metallic leaf spring, though any resilient member that is capable of providing the required bias may alternately be used.

FIG. 3c is an enlarged side view of the first latch member.

It is of great advantage to the animal handler to be able to replace the broken safety snap quickly and easily. The preferred embodiment of the invention provides a reservoir 34 within the first latch member. The reservoir, which is dimensioned for storage of at least one shear pin, is covered by the resilient member. Upon the breaking of the shear pin and opening of the latch, the resilient member may easily be removed. Note that one side of the member is pinned down, such that the member is readily lifted up on the other side to uncover the reservoir for access to, and removal of, replacement shear pins.

FIG. 4 is an enlarged top view of the first latch member 24 of the invention, showing the uncovered reservoir 34.

Although the invention is described herein with reference to the preferred embodiment, one skilled in the art will readily appreciate that other applications may be substituted for those set forth herein without departing from the spirit and scope of the present invention. For example, the shear pin may or may not be an integral part of the safety snap's hardware. The shearing structure may not be in the shape of a pin, but may be some alternate structure adapted to be sheared without damaging the rest of the safety snap.

The safety snap of the preferred embodiment is specifically adapted for use in restraining livestock. For this particular application, there is a four to one ratio in force applied to the shear pin as compared to the safety snap, thus protecting the snap from potentially damaging stress. This ratio in force may be varied according to the requirements of the particular use of the safety snap. The shear pins can easily be manufactured for different breaking strengths. The safety snap is readily adaptable for numerous uses, including but not limited to attachment with ropes, straps, different-sized halters, and reins. Additionally, the shearing action at the shear pin may be used in connection with an electrical switch or sensor 40 to gauge or control an electrical circuit 42 and thereby provide an indication of failure or potential failure of the clasp.

Accordingly, the invention should only be limited by the Claims included below.

We claim:

1. A safety snap, comprising:

a first clasp member;

a second clasp member movably attached to said first clasp member to form a clasp, such that, in a first closed position, said first and second clasp members are positioned wherein said second clasp member is biased against said first clasp member, and in a second open position wherein application of pressure to said second clasp member urges said second clasp member away from said first clasp member;

a first latch member rotatably attached to said first clasp member;

a second latch member pivotally attached to said first latch member to form a latch;

a shear pin, adapted to break upon the application of a selected amount of force, for securing said first latch member to said second latch member in fixed attachment in a closed position; and a resilient member, affixed to said first latch member and upwardly biasing said shear pin;

wherein upon the breaking of said shear pin, said second latch member is pulled away and released from said first latch member, thereby opening the latch.

2. The safety snap of claim 1, wherein said first and second clasp members are movably attached with a pin.

3. The safety snap of claim 1, wherein said first clasp member defines a reservoir dimensioned for storage of at least one replacement shear pin.

4. The safety snap of claim 1, wherein said first and second latch members are rotatably attached about the axis of a pin.

5. The safety snap of claim 1, wherein said resilient member is attached to said first latch member with a screw.

6. The safety snap of claim 1, wherein said resilient member is attached to said first latch member with a rivet.

7. The safety snap of claim 1, wherein said resilient member removably covers said reservoir.

8. The safety snap of claim 1, wherein said resilient member is a metallic leaf spring.

9. The safety snap of claim 1, further comprising:

an electrical sensor associated with said snap and adapted to monitor shear stress at or proximate to said shear pin, and provide a signal to an electrical circuit to thereby indicate failure or potential failure of the clasp.

10. A method for using a safety snap, comprising:

movably attaching a first clasp member to a second clasp member to form a clasp, such that, in a first closed position, said first and second clasp members are positioned wherein said second clasp member is biased against said first clasp member, and in a second open position wherein application of pressure to said second clasp member urges said second clasp member away from said first clasp member;

rotatably attaching a first latch member to said first clasp member;

pivotally attaching a second latch member to said first latch member to form a latch;

securing said first latch member in fixed attachment to said second latch member in a closed position, with a shear pin; and affixing a resilient member to said first latch member, such that said resilient member upwardly biases said shear pin;

wherein upon the breaking of said shear pin, said second latch member is pulled away and released from said first latch member.

11. The method of claim 10, further comprising the steps of:

storing at least one replacement shear pin within a reservoir defined by said first latch member, wherein said reservoir is removably covered with said resilient member;

removing said resilient member to uncover said reservoir; and removing a replacement shear pin from said reservoir.

* * * * *